June 7, 1966  J. C. LESHER  3,255,432
TRAFFIC LIGHT CONTROL SYSTEMS
Filed Sept. 26, 1962  6 Sheets-Sheet 1

Fig.1

INVENTOR
JOHN C. LESHER

Kimmel & Crowell
ATTORNEYS

June 7, 1966 J. C. LESHER 3,255,432
TRAFFIC LIGHT CONTROL SYSTEMS
Filed Sept. 26, 1962 6 Sheets-Sheet 2

INVENTOR
JOHN C. LESHER
BY Kimmel & Crowell
ATTORNEYS

June 7, 1966 J. C. LESHER 3,255,432
TRAFFIC LIGHT CONTROL SYSTEMS
Filed Sept. 26, 1962 6 Sheets-Sheet 6

INVENTOR
JOHN C. LESHER
BY Kimmel & Crowell
ATTORNEYS

United States Patent Office 3,255,432
Patented June 7, 1966

3,255,432
TRAFFIC LIGHT CONTROL SYSTEMS
John C. Lesher, Erie, Pa., assignor to Rad-O-Lite, Inc., Erie, Pa., a corporation of Pennsylvania
Filed Sept. 26, 1962, Ser. No. 226,276
10 Claims. (Cl. 340—35)

The present invention relates to traffic light control systems and more particularly to an electronic traffic light control system in which individual intersection control mechanisms located at various intersections to be regulated may be controlled from a central location independently of one another or in accordance with specific interrelated patterns or may be rendered completely independent of the central control station, and function in accordance with locally generated control information.

It is an object of the present invention to provide a system including a master controller, for each intersection controller, the master controller being located at a central control station, and a decoding and supervisory unit located at each intersection, which system provides a great deal of flexibility of control of and a high degree of supervision of the individual intersection controllers even though the master controller and the supervisory unit are coupled by a single pair of telephone or other private lines.

It is another object of the present invention to provide a plurality of centrally located master controllers, each for controlling the traffic lights at a distinct remote intersection and to provide either independent or interrelated operation of the master controllers so as to permit independent or interrelated operation of the traffic lights at the remote intersections.

It is still another object of the present invention to provide a centrally located master control unit and a remotely located intersection supervisory unit which permit the intersection signals to be cycled in accordance with timing provided at the central location, or in the event of difficulty, permit the intersection controller to provide timing independently of the master controller.

It is another object of the present invention to provide a master controller at a central location and an intersection supervisory unit at a remote location such that distinct indications are transmitted to the master controller of (1) a short or open circuit condition in the interconnecting leads, (2) a failure of the intersection signals to follow the master controller signals, (3) a burn out of any one of the red lamps at the intersection, and (4) a power failure or blown fuse at the intersection and which unit, upon failure of the master controller, places the traffic lights at the remote intersection under local control.

It is another object of the present invention to provide a system including a master controller at a central location and a supervisory unit located at an intersection to be controlled in which a flashing condition of amber on a main street and red on a cross street may be initiated either at the intersection controller or at the master controller.

It is another object of the present invention to provide a master controller at a central location and a supervisory unit located at an intersection where traffic lights are to be controlled in which the controller and unit are interconnected by a single pair of lines and in which the master controller may cause the traffic lights to cycle through normal red, amber and green signals, may institute a flashing control at the remote intersection and may control the display of a walk or don't walk signal at the intersection thereby providing four distinct functions at the intersection.

It is another object of the present invention to provide a plurality of master control units at a central control location in which each master controller supervises the operation of a distinct signal light at a remote location in which the master controllers may be interrelated so as to provide wave signal operations at the intersections in forward or reverse directions depending upon the major flow of traffic at the particular interval under consideration.

It is still another object of the present invention to provide master control units at a central control location in which the master control units may be interrelated so as to provide a wave type of signal control in which an independent variable delay between each light along a particular street obtaining a green condition and in which the timing of the wave in the opposite direction is also independently variable.

It is another object of the present invention to provide a master controller at a central location and a supervisory unit at an intersection which devices are interconnected by a pair of leads, and to permit telephone communications to be provided between an operator at a central location and an individual at the remote location.

It is yet another object of the present invention to provide a master controller at a central location and a supervisory unit at an intersection which master controller may be placed under the further control of a computer programming or related device which is operated in accordance with the traffic pattern detected at the particular intersection to be controlled. The present invention is related to my co-pending application Serial No. 164,047, filed January 3, 1962 and entitled "Traffic Light Controller," and assigned to the assignee of the present application.

The above and still further objects, features and advantages of the present invention will become apparent upon consideration of the following detailed description of several embodiments thereof, especially when taken in conjunction with the accompanying drawings, wherein.

Figure 1:
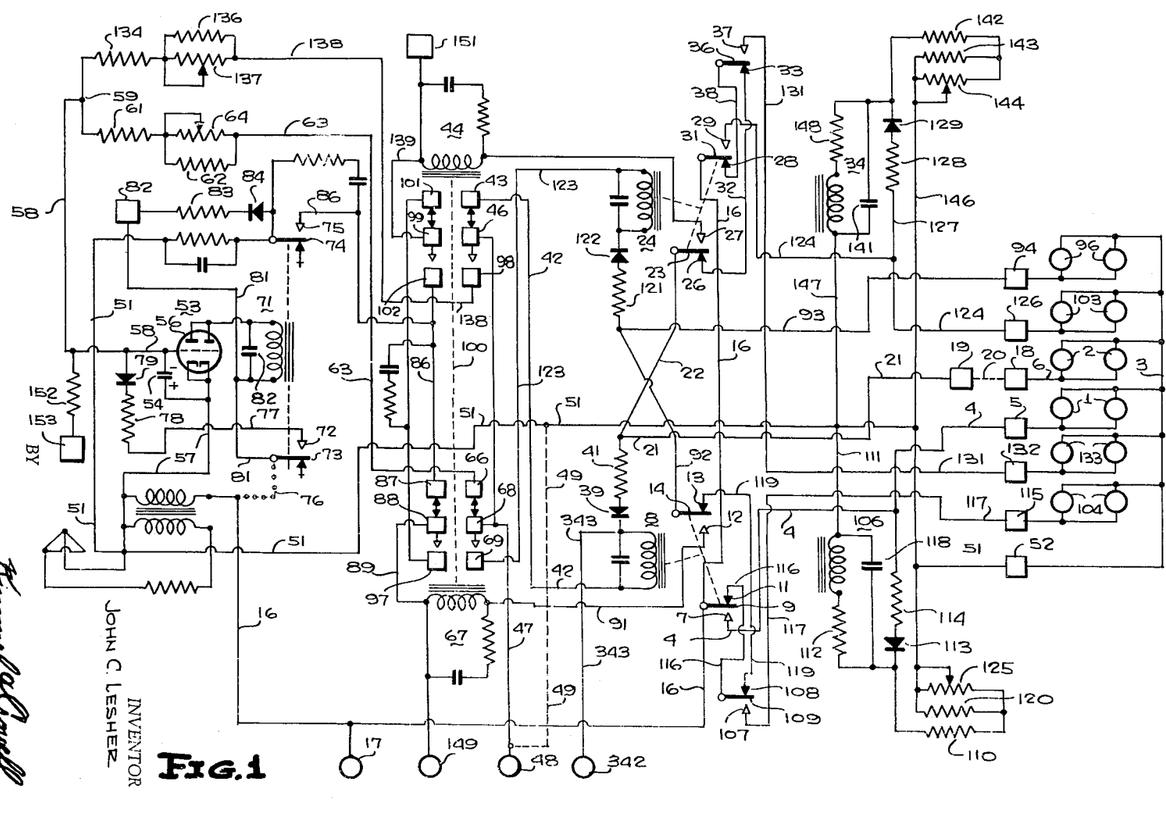
FIGURE 1 is a schematic circuit diagram of an electronic traffic light control unit forming the subject matter of the aforesaid co-pending application.

Referring specifically to FIGURE 1 of the accompanying drawings, there is illustrated a schematic electrical circuit diagram of the basic traffic light controller which forms the subject matter of the aforesaid pending application.

The circuit is illustrated in the condition in which green lights 1, arrayed along a main street, and red lights 2, arrayed along a cross street, are illuminated. The lights 1 and 2 are connected to a common bus 3 which, for purposes of explanation, will hereafter be referred to as ground or common. The energizing voltage for the lights 1 is applied to a lead 4 connected to the lights via a terminal 5, while the energizing voltage for the lights 2 is applied to a lead 6. The lead 4 is connected to a stationary contact 7 of a relay 8 having a first movable contact 9. When the relay 8 is energized, the contact 9 engages stationary contact 7, but when the relay 8 is deenergized, contact 9 engages a stationary contact 11, as illustrated. The relay 8 is provided a further set of stationary contacts 12 and 13 which are alternately engaged by a movable contact 14, the movable contact 14 engaging the contact 12 when the relay 8 is energized. The movable contact 9 is connected via a high voltage bus 16 to a high voltage, A.C. input terminal 17 and thus, it is seen that high voltage is applied to the lead 4 via contacts 7 and 9 and the high voltage bus 16 to complete the energizing circuit for the main street green lights 1.

The lead 6, on which is to be developed the high voltage for illuminating lamps 2, is connected to a terminal 18 which, in turn, is connected to a terminal 19 via a jumper 20 illustrated as a dotted line. This jumper may be removed when certain auxiliary equipment is to be added and this will be discussed in detail subsequently. The terminal 19 is connected via a lead 21 to a further lead 22 which is connected to a movable contact 23 of a relay 24 having stationary contacts 26 and 27 cooperating with the movable contact 23. The relay 24 is deenergized and, in this condition, the movable contact 23 is in engagement with contact 26. The relay 24 is provided with a further set of stationary contacts 28 and 29 adapted to be alternatively engaged by a movable contact 31 which, when the relay 24 is deenergized, engages the contact 28.

The contact 26 of the relay 24 is connected via a lead 32 to a stationary contact 33 of a relay 34 which is deenergized during this interval. The relay 34 has a movable contact 36 which is in engagement with the stationary contact 33 when the relay is deenergized and which engages a further stationary contact 37 when the relay is energized. Since the relay 34 is deenergized, the lead 32 is connected via contacts 33 and 36 of the relay 34 over a lead 38 to the stationary contact 28 of the relay 24. The contact 28 is engaged by the movable contact 31 of the relay 24 connected to the high voltage bus 16. Thus, the cross street red lamps 2 are illuminated as a result of having a high voltage applied thereto via lead 6, terminal 18, jumper 20, terminal 19, lead 21, lead 22, contacts 23, 26, lead 32, contacts 33, 36, lead 38 and contacts 28 and 31 to the high voltage bus 16.

The relay 8 is now energized by an energizing circuit through a diode 39 and resistor 41 connected between the lead 21 and the upper end of the coil of the relay 8, as illustrated in FIGURE 1. The lower end of the coil of the relay 8, also as illustrated in FIGURE 1, is returned to common or ground via a lead 42, engaged stationary contact 43 and movable contact 46 of latching relay 44 and a lead 47 returned to a terminal 48 to which the system common or ground is connected. It will be noted that the common terminal 48 is connected to ground via a jumper 49 which is illustrated by dotted lines, to a lead 51 connected to the common terminal 52 of the system.

The interval during which the traffic light controller is maintained in the condition described immediately above, and illustrated in FIGURE 1, is determined by a timing circuit generally designated by the reference numeral 53. The circuit includes a timing capacitor 54 connected in the grid circuit of a parallel-connected, dual triode 56. The lower end of the capacitor 54, which is designated by a plus sign, is returned via a lead 57 to a common voltage or grounded bus 51 whereas the upper end of the capacitor as illustrated by the negative sign is connected via a lead 58 to a junction 59. The junction 59 is connected via a resistor 61 and resistor 62 connected in series to a further lead 63. An adjustable resistor 64 is connected in parallel with resistor 62 and is employed to control the time constant of the discharge circuit of the capacitor 43. The adjustable resistor 64 is the main street green control in that it determines the interval during which the main street light is maintained green as will be apparent from the continued discussion. The lead 63 is connected to a stationary contact 66 of a latching relay 67 having a movable contact 68 which, in the position illustrated, engages the contact 66 and when the relay 67 is energized is moved into engagement with a further stationary contact 69. The contact 68 is connected to the lead 47 to which the common return lead 51 is also connected via the jumper 49. Therefore, a series circuit is established including the capacitor 54 and the resistors 61, 62 and 64.

The capacitor 43, as will be explained subsequently, initially has a negative voltage applied thereto rendering the tube 56 nonconductive. After an interval, as determined by the value of the resistors 61 and 62 and the setting of the resistor 64, the capacitor 54 becomes sufficiently discharged to permit the tube 56 to conduct. Upon conducting, the tube 56 energizes a relay 71 having a first set of contacts including a stationary contact 72 and a movable contact 73 and a second set of contacts comprising the movable contact 74 and a stationary contact 75. When the relay 71 is deenergized, the contacts assume the position illustrated whereas when the relay is energized, the movable contacts 73 and 74 engage the stationary contacts 72 and 75, respectively. The movable contact 73 is connected via a jumper 76 to the high voltage lead 16 and thus, when the contact 73 engages contact 72, it applies a voltage via a lead 77, resistor 78 and diode 79 to the lead 58, thereby negatively charging the capacitor 54, the diode 79 being poled so that negative voltage swings are applied to the capacitor from the A.C. high voltage lead 16. Charging of capacitor 54 thereafter renders the tube 56 nonconductive.

The high voltage operating potential of the tube 56 is derived from the A.C. high voltage lead 16 via jumper 76 and a lead 81 to the lower end of the coil 71 as illustrated in FIGURE 1, a capacitor 82 maintaining the relay 71 energized during negative swings of the A.C. high voltage. The lead 81 is further connected to a terminal 82 connected through a resistor 83 and a diode 84 to the movable contact 74. Thus, a pulsating A.C. is developed on the movable contact 74 so that when it engages its associated stationary contact 75, upon energization of the relay 71, a pulsating voltage is applied to a lead 86 connected to a stationary contact 87 of the latching relay 67. During this instant of operation, the stationary contact 87 is engaged by a movable contact 88 connected via a lead 89 to the left end of the coil of the relay 67 as illustrated in FIGURE 1. The right end of the coil of the relay 67 is connected via a lead 91, contacts 12 and 14 of the relay 8 and a lead 92 and a further lead 93, to a terminal 94 connected to the lower ends of main street red lamps 96 connected in parallel with one another. The upper ends of the main street red lamps 96 are connected to the ground return lead 3. Thus, the coil of the relay 67 is returned to ground through the main street red lamps 96. Since these lamps are deenergized at this moment, their resistance is quite low and sufficient current is permitted to flow from the lead 89 through the coil of the relay 67 to the ground return lead 3 to energize the coil.

Upon energization of the relay 67, the movable contact 68 is brought into engagement with the stationary contact 69 and the movable contact 88 is brought into engagement with a further stationary contact 97 of the relay 67. The contacts of the relay 44 and 67 are interconnected by mechanical connection 100 so that upon energization of the relay 67, the movable contact 46 of the relay 44 engages stationary contact 98 and a further movable contact 99 of the relay 44 becomes disengaged from a stationary contact 101 and moves into engagement with a stationary contact 102. The interconnected relays 44 and 67 are latching relays so that the movable contacts thereof maintain the last cited positions even after the removal of the high voltage from the relay 67 which occurs when the tube 56 is again rendered nonconductive.

The system is now primed for a new condition in which the main street red lamps 96 and the cross street green lamps 103 are energized. In changing from a main street green to main street red, it is first desired, in conformance with usual practice, to energize main street amber lamps 104 and this is accomplished by the deenergization of the relay 8 and energization of a further relay 106 having stationary contact 107 and 108 and a movable contact 109 which is in engagement with the contact 107 when the relay 106 is energized. The upper end of the relay 106 is connected via a lead 111 to the common return 51 and the lower end of the relay is connected under the conditions illustrated in FIGURE 1 via a resistor 112, diode 113 and resistor 114 to high voltage lead 4.

When the relay 67 is energized, the ground return lead for relay 8 is broken at contacts 43, 46 of relay 44 and relay 8 is deenergized. Movable contact 14 moves out of engagement with the stationary contact 12 and engages the contact 13 while the movable contact 9 moves out of engagement with the contact 7 and engages the contact 11. High voltage is now applied from the high voltage lead 16 and through movable contact 9 to the stationary contact 11 of the relay 8 and via a lead 116 to movable contact 109 of relay 106. Movement of the movable contact 9 out of engagement with the contact 7 breaks the energizing circuit to the relay 106, but a capacitor 118 connected in parallel therewith maintains the relay 106 energized for a length of time determined by resistors 110 and 120 connected in series between the lower end of the capacitor 118, and the common lead 51 also connected via the lead 111 to the upper end of capacitor 118. A variable resistor 125 is connected in parallel with resistor 120 and determines the discharge rate of capacitor 118 and therefore the delay in deenergization of relay 106. During the interval between deenergization of relays 8 and 106, high voltage is applied through contacts 107 and 109 of relay 106 and lead 117, and terminal 115 to main street amber lights 104. After the relay 106 times out the contacts 107 and 109 open deenergizing the amber lights 104. Contact 109 now engages contact 108 and applies high voltage via lead 119 and contacts 13 and 14 to lead 92.

High voltage is thus applied to the lead 93 connected to the main street red lamps 96. Application of high voltage to the lead 92 also energizes the relay 24 via a resistor 121 and diode 122, the ground return of the relay 24 now being completed via a lead connected through the contacts 68 and 69 of the relay 67 to the common bus 47. Since the cross street red lamps 2 are energized through both sets of contacts of the relay 24 when it is deenergized, the red lights 2 on the cross street are not deenergized until after the completion or termination of illumination of the amber lights 104 on the main street.

Upon the energization of the relay 24, the movable contact 23 is moved out of engagement with the contact 26 and is moved into engagement with the contact 27. Concurrently, the movable contact 31 is moved out of engagement with the stationary contact 28 and is moved into engagement with the contact 29. The contact 29 is connected via a lead 124 to a terminal 126 connected to the lower end of the cross street green lamps 103, thus completing the energizing circuit for these lamps. Application of high voltage to the lead 124 also applies a voltage to a lead 127 connected therewith which is connected through a resistor 128 and diode 129 to the upper end of the coil of the relay 34. Energization of the coil of the relay 34 now causes the movable contact 36 to become disengaged from the stationary contact 33 and become engaged with a stationary contact 37. The contact 37 is connected via a lead 131 to the terminal 132 connected to the lower end of cross street amber lights 133, conditioning this circuit for future operation. However, since the lead 38 is connected to the stationary contact 28 of the relay 24, no voltage is now applied to this circuit, the movable contact 31 now being in engagement with the contact 29.

When the latching relay 67 was energized at the beginning of this interval of operation, the timing resistors 61, 62 and 64 for the capacitor 54 were removed from the circuit due to opening of contacts 66 and 68 but an additional set of resistors 134, 136 and adjustable resistor 137 were connected in the circuit via a lead 138 and contacts 46 and 98 of the relay 44. The capacitor 54 now discharges through these resistors until the voltage thereacross permits the tube 56 to again become conductive. The independent controls provided by the first group of resistors 61, 62, 64 and the second group of resistors 134, 136, 137 permits independent adjustment of the periods of red and green on the intersecting streets.

Energization of the relay 71 again causes the contacts 72 and 73 to become engaged and apply a negative bias to the capacitor 54 to again stop conduction of the tube. The relay 71 upon being energized also closes contact 74 and 75 which now apply a high voltage via lead 86, and contacts 102 and 99 of the relay 44, to a lead 139 which energizes the relay 44 and shifts the contacts associated with relay 44 and 67 back to the positions illustrated in FIGURE 1. The relay 24 is now deenergized and causes a high voltage to be applied through contacts 36 and 37 to the lead 131 thereby energizing the cross street amber lights 133. After the relay 34 times out the movable contact 36 returns to the position illustrated in FIGURE 1 and energizes the relay 8 now causing its contacts to assume the position illustrated in FIGURE 1, thus energizing the main street green lamps 1. The cross street red lamps 2 are now also energized through contacts 31 and 28 of the relay 24 and contacts 36 and 33 of the relay 34.

The timing of the relay 34 is determined by a capacitor 141, connected in parallel with the coil of the relay and resistors 142, 143 and an adjustable resistor 144 connected in parallel with resistor 143. These resistors are returned via a lead 146 to the common return lead 51 to which the other end of the capacitor 141 is connected via a lead 147. Thus, the timing of the capacitor 141 is determined by the resistors 142, 143 and 144 connected in parallel therewith. A resistor 148 connected between the upper end of the capacitor 141 and the upper end of the coil 34, of course, also helps determine this timing interval since the rate of discharge of the capacitor 141 through the coil of the relay 34 is determined by the value of resistance 148.

A complete cycle of operation of the apparatus has now been explained and it will be seen that the controller provides for independent control of the timing of the red and green intervals on the main and cross streets and also independent timing of the amber periods on the main and cross streets.

As previously indicated, the apparatus is specifically adapted for external control and a discussion of this feature will now be undertaken. It will be noted that the lead 89 connected to the left side of the coil of the relay 67 is also connected to a terminal 149 while the lead 139 connected to the left side of the relay 44 is connected to a terminal 151. The relays 44 and 67 may be controlled by the application to terminals 151 and 149, respectively, of external sources of voltage and if the timing circuit associated with the timer control 53; that is, capacitor 54 and tube 56 and the various resistors, is rendered inoperative, control of the apparatus may be effected completely from external sources. It will be noted that the lead 58 connected to the grid of the tube 56 is connected through a resistor 152 to a terminal 163. If now a constant negative voltage is applied to the terminal 153, the tube 56 is held nonconductive for the interval during which this negative voltage is applied. Thus, if it is desired to control the relays 44 and 67 from an external circuit, a negative voltage may be applied to the terminal 153 rendering the entire timing circuit inoperative. The system illustrated in FIGURE 1 is completely independent of all other circuits or systems other than the supply of power from a convenient power line; that is, when the power is supplied to the apparatus of FIGURE 1 is automatically cycles through repetitive green, amber and red signals on each of the streets involved and does not require any other circuitry of external control. However, as previously indicated, it often is desired to provide external control of the system.

Figure 2:
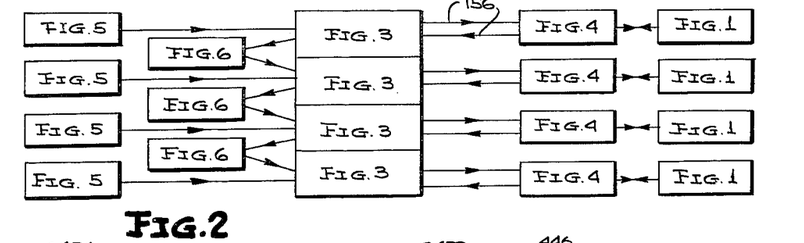
FIGURE 2 is a schematic block diagram illustrating the interrelationship of the various figures of the accompanying drawings.

In accordance with the present invention, a master controller for each of the intersection units such as that of FIGURE 1 is provided which permits control of the apparatus of FIGURE 1 in accordance with a number of various different control functions. These controls may be such as to vary the timing cycles in accordance with rush hour traffic, to provide wave operation of the various intersection units of FIGURE 1 so that traffic can be caused to flow in a continuous wave along the street or may be related to centralized "walk"-"don't walk" controls and various other functions. In addition, it may be desired to monitor the operation at each intersection so as to detect failures particularly at important intersections in the main business district. In accordance with the present invention, each of the various enumerated control and monitor functions is achieved by the interconnections of the circuits of the various figures as indicated in FIGURE 2 of the accompanying drawings. Associated with each of the traffic light controllers illustrated in FIGURE 1 is a decoder and supervisory unit of FIGURE 4 which interprets information supplied thereto from a master controller of FIGURE 3 via telephone lines 156 and reports back to the master controller of FIGURE 3 any malfunction of the apparatus of FIGURE 1. The malfunction of the apparatus of FIGURE 1 or even of the apparatus of FIGURE 4 is displayed by the apparatus of FIGURE 3 in conjunction with the apparatus of FIGURE 5.

Figure 3:
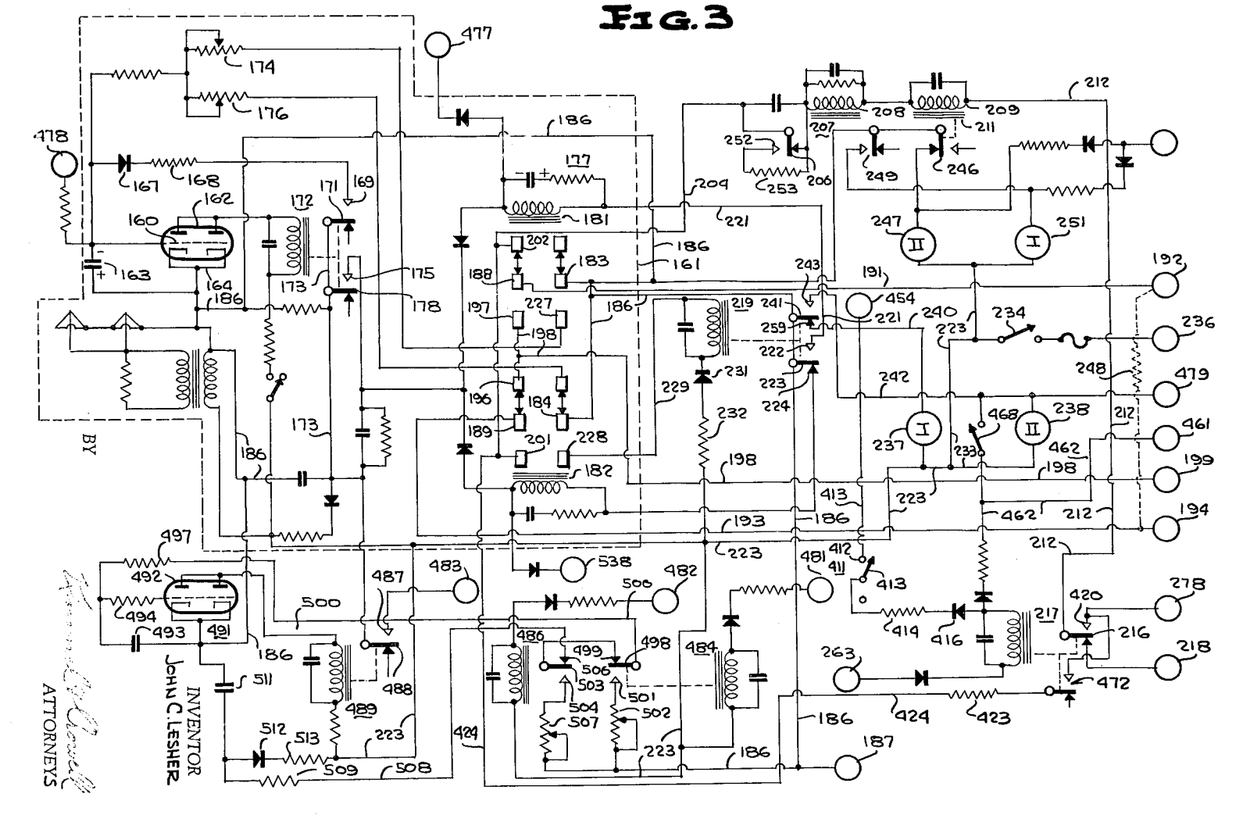
FIGURE 3 is a schematic electrical wiring diagram of the master controller of the present invention which is located at a central station.
Figure 4:
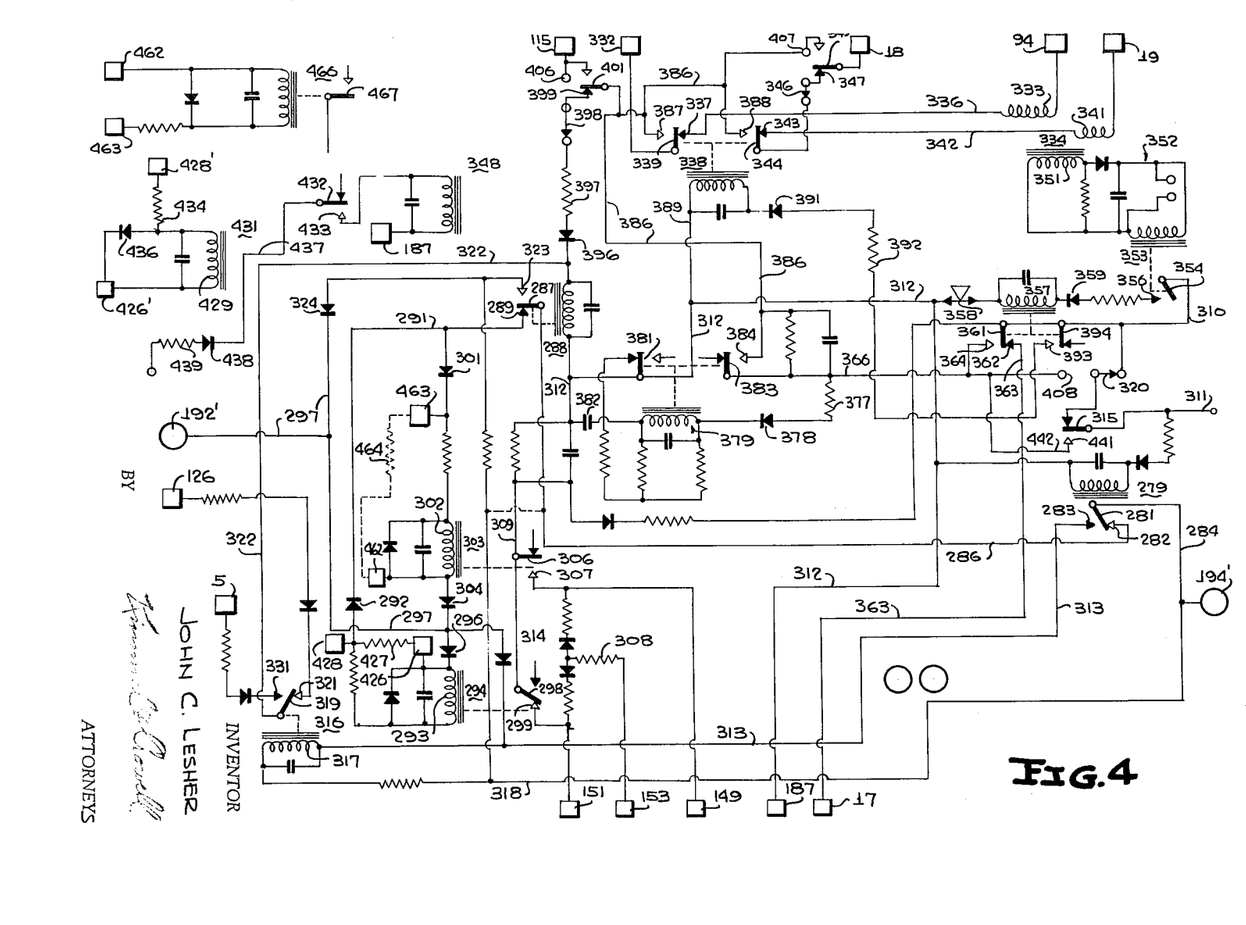
FIGURE 4 is a schematic electrical wiring diagram of the combination decoder and supervisory unit located at each intersection to be controlled.
Figure 6:
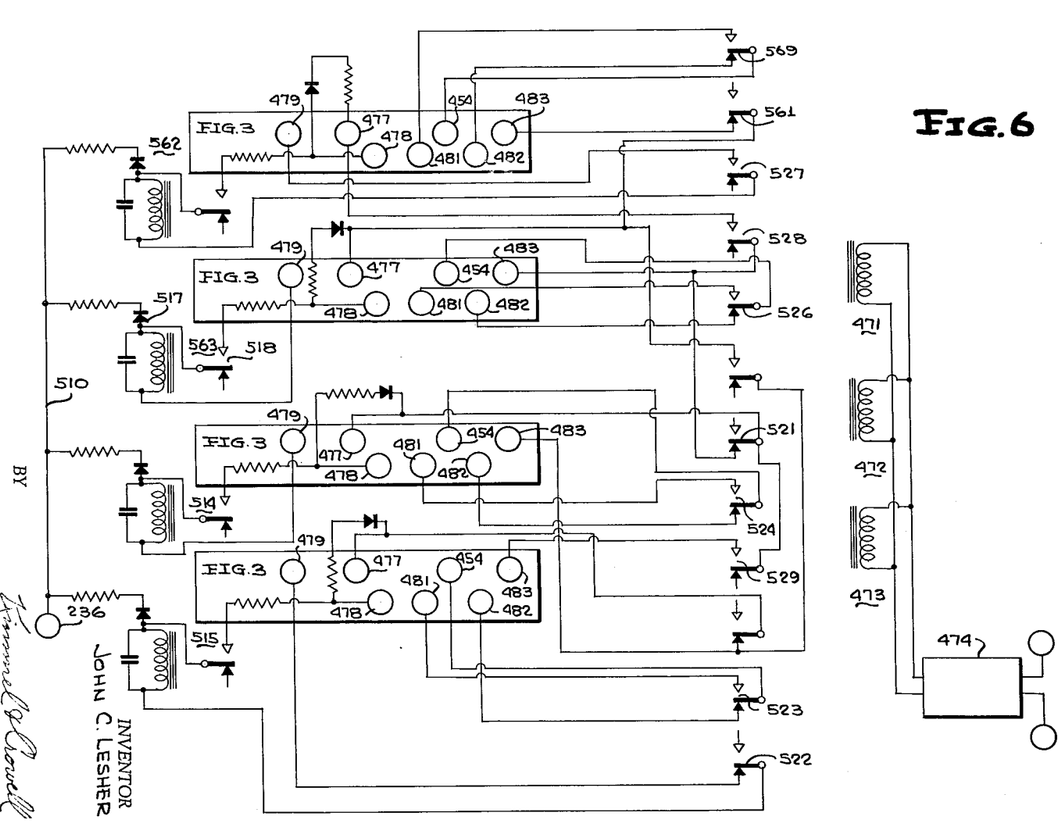
FIGURE 6 is a partial schematic and partial block electrical diagram illustrating the interrelationship between the master controllers of FIGURE 3 required to provide for wave operation of the remote lights and also to provide a counter wave operation.

The apparatus of FIGURE 3 provides a master timing function which is transmitted to the circuitry of FIGURE 4, which in turn, disables the internal timing circuit of FIGURE 1 and controls the apparatus of FIGURE 1 in accordance with the master timing signals provided by the apparatus of FIGURE 3. The various master controls of FIGURE 3 may be interconnected as indicated in FIGURE 6 of the accompanying drawings so as to interrelate the timing in the various apparatus of FIGURE 3 to provide wave timing at the street intersections.

Referring now specifically to FIGURE 3 of the accompanying drawings, there is illustrated the central or master control apparatus employed to transmit control signals to FIGURE 4 and thus to control the intersection controller of FIGURE 1 and to receive and interpret trouble signals transmitted by the apparatus of FIGURE 4. The apparatus of FIGURE 3 is provided with a timing circuit and latched relay arrangement which is very similar to that illustrated in FIGURE 1, this portion of FIGURE 3 being enclosed within a dashed line box 161. Since this portion of the circuit is almost identical, except for certain minor changes, with that illustrated in FIGURE 1 it will be described only very briefly.

The apparatus is provided with a tube 162 having a capacitor 163 connected between its cathodes 164 and its grid 166. The capacitor is connected via a diode 167 and resistor 168 to a stationary contact 169 associated with the movable contact 171 of a relay 172 which is energized through the tube 162. Stationary contact 171 is connected via the lead 173 to a source of negative potential. Upon energization of the relay 172, the contact 171 closes the contact 169 and charges the capacitor 163 negatively to shut off the tube 162. The capacitor 163 is timed out through adjustable resistors 174 and 176 alternatively depending upon the position of a latched relay 177 after energization of its respective coils in response to operation of the relay 172. More specifically, the relay 172 is provided with a further stationary contact 175 and a movable contact 178 connected to the lead 173. When the relay 172 is energized, the stationary contact 175 and therefore lead 179 has a negative voltage pulse applied thereto. The pulse is coupled through appropriately poled diodes to coils 181 and 182 of the latched relay 177 and, as will become apparent subsequently, that coil which has its other side returned to ground or common is energized to move the associated movable contacts. Movement of the movable contacts of the relay 177 connects one or the other of the variable resistors 174, 176 into the circuit to timeout the capacitor 163.

As in FIGURE 1, the dual latched relay 177 is provided with a series of stationary and movable contacts. More particularly, relay 177 is provided with two movable contacts 183 and 184 connected together and via a lead 186 to a terminal 187 connected to the A.C. common or ground. The latched relay arrangement is provided with two further movable contacts 188 and 189. The contact 188 is connected via a lead 191 to a first output terminal 192 of the circuit while the movable contact 189 is connected via a lead 193 to a second output terminal 194. The terminals 192 and 194 are connected across a telephone or private line and corresponds to the leads 156 of FIGURE 2.

The terminals 192 and 194 are adapted to have positive and negative voltages applied thereto, a negative voltage being applied to one of the terminals when positive voltage is applied to the other and vice versa. A stationary contact 196 is associated with the movable contact 189 and a stationary contact 197 is associated with movable contact 188; the contacts 196 and 197 being connected via a lead 198 to one another and to a terminal 199 adapted to have a negative voltage applied thereto. Stationary contacts 201 and 202, associated with movable contacts 189 and 188 respectively, are connected together via a lead 203 and then connected via a lead 304, closed contacts 206 of a relay 207 to the coil 208 of the relay 207, through coil 209 of the relay 211, thence over lead 212, through normally closed contacts 216 of a relay 217 to a terminal 218 adapted to have a positive voltage applied thereto.

As previously indicated, the coils 181 and 182 of the latching relay 177 are separately returned to the common lead 186 through contacts of a further relay 219. The right end of the coil 181, as illustrated in FIGURE 3, is connected via a lead 221 to a stationary contact 222 adapted to be engaged by a movable contact 223 of the relay 219. The movable contact 223 normally engages a stationary contact 224 of the relay 219 the movable contact being connected to the lead 186. When the relay 219 is not energized, the movable contact 223 assumes the position illustrated in FIGURE 3 and applies the ground return to the stationary contact 224 which is connected via a lead 226 to the right end of the relay coil 182. Upon the tube 162 firing the movable contact 178 engages the stationary contact 175 and applies a negative voltage pulse to the lead 179 and thence to both of the coils 181 and 182 of the latching relay 177. However, only the coil 182 has its right end returned to ground and therefore this relay is energized. Upon energization of the relay the movable contacts 183, 184, 188 and 189 move from the position illustrated in FIGURE 3 and engage stationary contacts 227, 228, 197 and 201, respectively. Engagement between contacts 183 and 227 connects the variable resistor 174 into the discharge circuit of the capacitor 163 and starts discharging the capacitor for the next timing cycle. The contact 184 applies a ground return to the contact 228 which is connected via a lead 229 to the upper end, as viewed in FIGURE 3, of the coil of the relay 219. The lower end of the coil is connected through an appropriately poled diode 231 and resistor 232 to the ungrounded or hot side of the A.C. line 233. The lead 223 is connected via a switch 234 to a terminal 236 which is returned to the high valtage A.C. lead of the power supply to be described subsequently.

Thus, upon energization of the coil 182, the relay 219 is energized and the movable contact 223 engages the stationary contact 222. As previously indicated this contact is connected via lead 221 to the right side of the coil 181 so that upon the next firing of the tube 162 the coil 181 is energized and the latching relay again assumes the position illustrated in FIGURE 3. It will be noted that lamps 237 and 238 have their lower ends connected to the line 223. The upper end of the lamp 237 is connected via lead 240 to a stationary contact 259 associated with a second movable contact 241 of the relay 219. The upper end of the lamp 238 is connected via a lead 242 to a second stationary contact 243 associated with the movable armature 241 of the relay 219. When the relay 219 is not energized, this being the condition illustrated in FIGURE 3, ground return is applied to the lamp 237 which is illuminated and indicates that the coil 181 was the last coil energized. On the other hand, when the relay 219 is energized, the lamp 238 is returned to common, becomes illuminated and indicates that the coil 182 of the laching relay 177 was the last coil energized. Thus, the lamps 237 and 238 provide an immediate indication of the phase in which the system is now operating.

For purposes of explanation of the apparatus throughout the terms "phase 1" and "phase 2" are employed to designate the basic timing condition of the system, phase 1 indicating that the latching relay 177 is in the position illustrated in FIGURE 3 and phase 2 indicating that the latching relay 177 is in the position not illustarted in FIGURE 3; that is, for instance, with the movable contact 188 in engagement with the stationary contact 197. It will also be noted that when the apparatus is in phase 1, a plus voltage is applied via contacts 188 and 202 of the relay 177 to the terminal 192 and negative voltage is applied to the terminal 194 via the contacts 189 and 196. Conversely when the apparatus is in phase 2 negative voltage applied to the terminal 192 via contacts 188 and 197 and positive voltage is applied to the terminal 194 via contacts 189 and 201. Thus, it is seen that successive operations or firings of the tube 162 and therefore successive energizations of the latching relay 177 cause alternate positive and negative voltages to be switched to the output terminals 192 and 194 connected via the pair of lines 156 to the remote apparatus at the intersection to be controlled.

The relays 207 and 211 serve a specific function in the apparatus which relates to the detection of malfunctions of the remote apparatus either due to a failure in the leads 156 or to an actual failure of a component of the apparatus of either FIGURE 4 or FIGURE 1. It will be noted that both of these relays; that is, relays 207 and 211 are connected in series between the high voltage input terminal 218 and, depending upon the phase of the apparatus, the connection to one of the output terminals 192 or 194. If, for any reason the circuit between 192 and 194 is opened; that is, either due to a break in the one or both of the leads 156 or due to the opening of the circuit in FIGURE 4 in response to a specific condition to be detected, the relay 211 becomes deenergized and permits its associated contacts 246 to close. The movable contact of the pair of contacts 246 is connected to ground and the stationary contact is connected to the upper end of a lamp 247. The lower end of the lamp, as illustrated in FIGURE 3, is connected to the power lead 223 and thus when the contacts 246 close, the lamp 247 lights indicating an open circuit condition in the line.

The relay 207 is employed to detect a short circuit condition in the line. Note for the moment that a load resistor 248 is connected by dashed lines between the terminals 192 and 194. This resistor represents the total load normally across the terminals 192 and 194 and is chosen such that the normal current therethrough is insufficient to energize the relay 207. However, if a short circuit occurs across terminals 192 and 194 the increased current is sufficient to energize the relay 207. Upon energization the relay closes its associated contacts 249 to connect the upper end of a trouble light 251 to ground, the lower end of the lamp as illustrated in FIGURE 3 being connected to the power lead 223. The lamp 251 then indicates a short circuit condition or at least a condition which has caused a material increase in current through the system between terminals 192 and 194. The relay 207 has a further set of contacts 206. When the relay 207 is energized the contacts shift so that the movable contact engages the stationary contact 252 and inserts a current limiting resistor 253 into the circuit so as to prevent overloading of the various circuits and burning and other damage to the system. In summary an open circuit condition energizes light 247 whereas a short circuit condition energizes the light 251.

Figure 5:
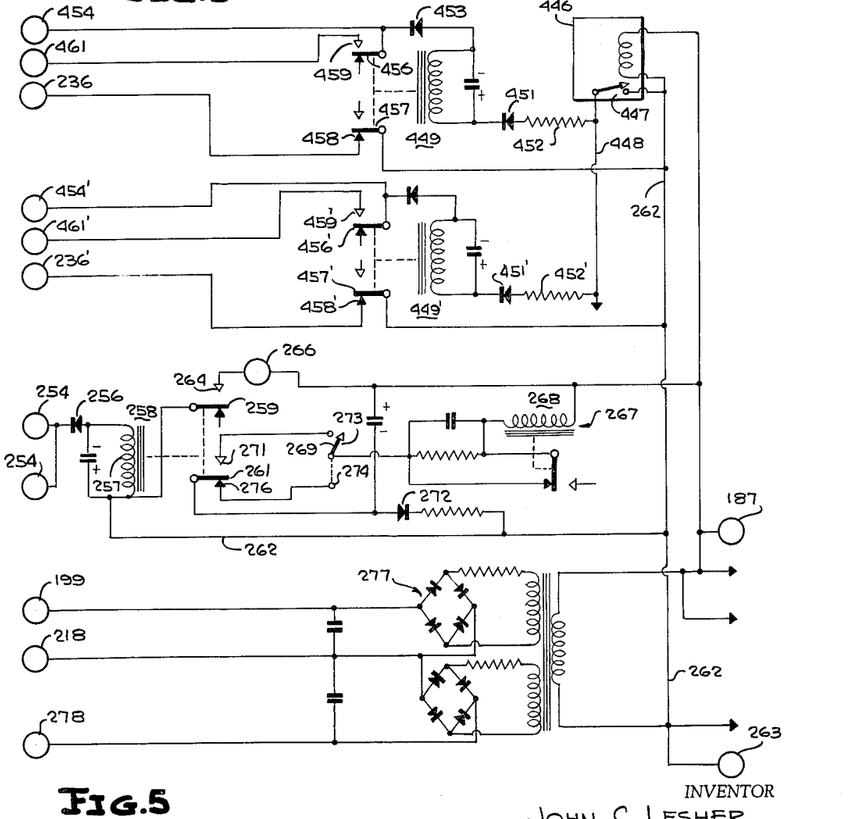
FIGURE 5 is a schematic electrical diagram illustrating the mechanism located at the central station and associated with the master controllers of FIGURE 3 to provide for automatic flasher control of the remote location and also to provide a general supervisory alarm which indicates a malfunction in the system.

The units of FIGURE 3 are mounted in a stacked array in a cabinet at a central station and the lamps 237, 238, 247 and 251 are arranged on the front of the individual panels. In order to provide both a general visual and audible alarm for the entire system, part of the circuitry as illustrated in FIGURE 5 is utilized in conjunction with the circuitry of FIGURE 3. Returning for a moment to FIGURE 3 it will be noted that a terminal 254 is connected to appropriately poled diodes and resistors to the upper ends of the lamps 247 and 251. When either of these lamps is energized, or more exactly when either of the relays 207 or 211 is energized the terminal 254 is returned to ground.

Referring now to FIGURE 5, the terminals 254 of all of the units of FIGURE 3 are connected through a common diode 256 to an upper end of a coil 257 of the relay 258 having movable contacts 259 and 261. The lower end of the coil 257 as viewed in FIGURE 5 is connected via a lead 262 to an A.C. ungrounded or power terminal 263. When the terminal 254 is returned to ground through the circuitry of FIGURE 3, the relay 258 is energized. Upon energization, the movable contact 259 engages a stationary contact 264 connected through a red indicator lamp 266 to terminal 187; that is, the common or ground return. Thus, the lamp 266 is connected across the A.C. line and is illuminated. The lamp 266 is arrayed on top of the rack containing the central office or master controllers of the FIGURE 3 and provides a readily visible display of an alarm condition. The operator upon seeing the alarm 266 can then investigate each of the individual equipments of FIGURE 3 to see which one has an illuminated red lamp and thus can determine from the latter lamps the faulty condition which subsists on a particular line. Also for the purpose of calling the operator's attention to an alarm condition, there is provided a buzzer mechanism 267 having an actuating coil 268 connected to the common line and through a first switch 269 to a stationary contact 271 of the relay 258. When the relay 258 is energized, the movable contact 261 engages the contact 271. The movable contact 261 is connected through an appropriately poled diode 272 and resistor to the hot side of the line. The buzzer is thus energized to attract the attention of the operator. In order to shut off the buzzer the operator must throw the switch 269 so that its movable contact 273 engages a stationary contact 274. Stationary contact 274 is connected to a stationary contact 276 of the relay 258 and is adapted to be engaged by the movable contact 261 when the coil 258 is deenergized. Thus, when the trouble on the line has been cleared and the ground return is removed from the terminal 254, deenergizing the relay 258, a circuit is again completed through the buzzer coil 268, the switch 269 and the contacts 261, 276 of the relay 258. To again shut off the buzzer, the operator must throw the switch 269 back to the position illustrated in FIGURE 5. Therefore, the buzzer is reset to the standby condition. The arrangement described avoids the possibility of the operator forgetting to reset the buzzer and thereby effectively negating the utility of the alarm. It will be noted that the terminals 254 of all of the units illustrated in FIGURE 3 are connected together to the common diode 256 so that regardless of which unit of FIGURE 3 detects the faulty condition the alarm system is actuated.

For purposes of completeness of explanation reference is made in FIGURE 5 to a power supply 277. This supply includes two conventional dual bridge rectifier arrangements providing a negative voltage at the terminal 199, a positive voltage at terminal 218 and a positive voltage at terminal 278 which is approximately three times the voltage appearing on the terminal 218. The purpose of the terminal 278 and the voltage applied thereto will be described subsequently.

Referring now specifically to FIGURE 4 of the accompanying drawings, there is illustrated a decoder and intersection supervisory unit which when associated with the apparatus of FIGURE 1 provides a complete system at each intersection adapted for remote control operation. It will be noted that the apparatus is provided with terminals 192' and 194' indicating that these terminals are connected via the line pair 156 to the terminals 192 and 194 respectively of FIGURE 3. In FIGURE 4, all relays assume the position illustrated when terminal 192' is positive and terminal 194' is negative or particularly when terminals 192 and 194 indicate a phase 1 condition.

A relay 279 is always energized and holds its movable contact 281 in the position illustrated; that is, in contact with stationary contact 282, whenever A.C. voltage is available to the system. If, for any reason, there is a failure of power at the intersection, the movable armature 281 engages the stationary contact 283 for purposes to be described subsequently. With the relay 279 energized, a circuit is completed from the terminal 194 via the lead 284, contacts 281 and 282, lead 286 to a movable contact 287 of a relay 288, normally deenergized to cause the movable contact to engage stationary contact 289. A stationary contact 289 of relay 288 is engaged by contact 287 and is connected via a lead 291 through a diode 292, which is poled to pass current when the contact 192 is positive, through a coil 293 of a relay 294, through another appropriately poled diode 296, and subsequently via a lead 297 to the terminal 192'.

Thus, upon the terminal 192' having a positive voltage applied thereto; that is, during the phase 1 condition, the relay 294 is energized and its armature 298 engages a stationary contact 299 connected to a terminal 151. Referring again to FIGURE 1, it will be noted that the terminal 151 is connected to the coil of the upper latching relay 44. When the relay 44 was the last to be energized a main street green signal is developed. Thus, a phase 1 condition of the apparatus of FIGURE 3 produces a main street green condition at the intersection and accordingly a cross street red condition. If now the terminal 194' is rendered positive this being a phase 2 condition, the current cannot take the path previously traced due to the polarization of the diodes 292 and 296 but follows a path through the contacts 287 and 289 and thence through a diode 301, coil 302 of a relay 303, another appropriately poled diode 304 to the lead 297 and thence to the terminal 192'. Thus, the relay 303 is energized during phase 2 and causes its movable contact 306 to engage stationary contact 307 and apply a voltage to the terminal 149. Voltage on terminal 149 energizes the latching relay 67 of FIGURE 1 which causes a green light to be displayed along the cross street.

It will be noted that a pair of diodes and resistors are connected between the stationary contacts 299 and 307 of the relays 294 and 303 respectively and the junction of the diodes is connected through a resistor 308 to the terminal 153. Since the voltage developed at the junction by both of the diodes is negative, the movable contacts 298 and 306 both being connected via a lead 309 to a negative source of potential, a negative bias is developed at the terminal 153 which renders the timing circuit 53 of FIGURE 1 inoperative. Thus, operation of the apparatus of FIGURE 1 is placed under the control of the apparatus of FIGURE 3 via the apparatus of FIGURE 4.

Considering now the supervisory aspects of the apparatus of FIGURE 4, as previously indicated, the hot side of the A.C. line is applied to a lead 311 and the common return is applied to a lead 312. Upon loss of the A.C. voltage, the relay 279 is deenergized and its movable contact 281 engages the contact 283. In phase 2, when the terminal 194' is positive, the current path now is over the lead 284 through the contacts 281 and 283 over lead 313 but is blocked by the diode 314 from the lead 297. Thus, in phase 2, an open circuit is developed between the terminals 192' and 194' and the lamp 247 of FIGURE 3 is illuminated. During phase 1 operation, current flows from the terminal 192' via the lead 297 directly through the diode 314 to lead 313 through contacts 281, 283 to the terminal 194'. Thus, during phase 1 operation the apparatus sees a short circuit. In consequence, as the apparatus of FIGURE 3 cycles between phase 1 and phase 2, the lamps 251 and 247, respectively, are illuminated as an indication of loss of power at the intersection equipment. In the event of failure of the A.C. line or a blown fuse or otherwise loss of voltage between the leads 311 and 312, the voltage is lost from terminals 149, 151 and 153, and the circuit of FIGURE 1 becomes independent of the master controller and operates under control of its own timer 53. The above described operation provides a fail safe system and due to the operation of the circuit of FIGURE 4 just described concurrently provides an indication of the failure at the central location.

It is assumed above that the apparatus of FIGURE 1 will on all occasions follow the commands given by the apparatus of FIGURE 3 transmitted to it through the apparatus of FIGURE 4. It is possible, however, that the master control unit of FIGURE 3 may be switched from, for instance, phase 2 to phase 1 while due to a malfunction, the apparatus of FIGURE 1 remains in a phase 2 condition. It should be noted that a relay 316 has its coil 317 connected via a lead 318 to the terminal 194' and through the diode 314 to the lead 297 and thence to the terminal 192'. When the terminal 192' is positive, the polarity of the diode 314 is such that the relay 316 is energized and its movable contact 319 engages the stationary contact 321 connected to the terminal 126 (see FIGURE 1). The terminal 126 has a high voltage applied thereto from FIGURE 1 when the cross green signal is illuminated, this being indicative of a phase 2 condition. However, the relay 316 is energized during a phase 1 condition and therefore normally there is no voltage applied to the terminal 126 when the contact 319 engages the contact 321. Under the malfunction assumed, voltage is developed at the terminal 126 when the relay is in the position illustrated and voltage is applied to the movable contact 319 via lead 322 to a coil of the relay 288. The lower end of the coil relay 288 is returned to the common lead 312 and thus the relay is energized. Upon energization, the relay 288 causes its movable contact 287 to disconnect from the stationary contact 289 and become engaged with a second stationary contact 323. The contact 323 is connected via an appropriately poled diode 324 to the lead 297. The diode 324 passes current only when the terminal 194' is positive relative to the terminal 192' and therefore a short circuit appears during the phase 2 operation. The phase 2 red bulb 247 of FIGURE 3 is illuminated but since the diode 324 blocks current flow in the reverse direction the current path during phase 1 operation is still through the coil 317 of the relay 316. In consequence, the malfunction described caused only the phase 2 trouble lamp to be illuminated, indicating to the central station operator that the controller at the intersection is stuck in the phase 2 condition. It will be noted that the main street green signal voltage appearing at terminal 5, is applied to a stationary contact 331 of the relay 316 and is contacted by the movable armature 319 during the phase 2 condition. If the main street green is illuminated during a phase 2 condition, which it obviously should not be, then high voltage is again applied via lead 322 to the relay 288 and causes an open circuit condition to exist during the phase 1 condition. This produces illumination of the lamp 251 of FIGURE 3, thereby indicating that there has been a failure in the controller.

The apparatus of FIGURE 4 also provides a distinct indication at the central station in response to failure of a bulb or particularly of a red light or bulb at an intersection. Not only does the supervisory system announce the bulb burn-out at the central location but also causes the other three red lamps in the system to go into a flashing red pattern so as to warn anyone approaching the intersection of the inherent danger implicit in such a situation. In order to provide this function, the terminal 94 of FIGURE 1 is disconnected from the lamps 96 and is connected to the terminal 94 of FIGURE 4. A terminal 332 of FIGURE 4 is connected to the lower connection to the lamps 96 as viewed in FIGURE 1. Also, the terminal 18 of FIGURE 1 is connected to terminal 18 of FIGURE 4, the jumper 20 between terminals 18 and 19 of FIGURE 1 is removed, and terminal 19 is connected to terminal 19 of FIGURE 4.

The terminal 94 is connected through a first primary winding 333 of a transformer 334 to a lead 336, and via a stationary contact 337 a relay 338, the contact 337 normally being engaged by a movable contact 339. The movable contact 339 is connected to the terminal 332. Thus, the main street red signal is completed through the primary winding 333 of the transformer 334. Similarly, the terminal 19 is connected through a second primary winding 341 of the transformer 334 to a lead 342 connected to another stationary contact 343 of the relay 338. The contact 343 is normally engaged by a movable contact 344 connected through a switch 346 to a stationary contact 347 of a relay 348. The contact 347 is normally engaged by movable contact 349 connected to the terminal 18. Thus, the primary winding 341 of the transformer 334 is connected in circuit with the cross street or phase 2 red signal.

The transformer 334 has a secondary winding 351 connected across a rectifier and filtering circuit 352 which supplies D.C. current to the coil of a relay 353. The relay 353 has a movable contact 354 normally held out of engagement with a stationary contact 356 when the current is flowing through either of the primary windings 333 or 341 of the transformer 334. However, if either a phase 1 or phase 2 red lamp burns out the current through one of these primary windings, and obviously only one is carrying current at a time, is reduced by one-half and this current is insufficient to maintain the relay 353 sufficiently energized to hold the contact 354 off the contact 356. Under these circumstances, the contact 354 engages the contact 356 and energizes a relay 357. More specifically, the relay 357 is connected through a reset switch 358 to the common return lead 312 while the other side of the coil of the relay 357 is connected through an appropriately poled diode 359 and the contacts 354 and 356 to a high voltage lead 310. The lead 310 is connected to the high voltage lead 311 via a normally closed switch 320 and normally closed contacts 315 of the relay 348.

Upon energization of the relay 357, a movable contact 361 becomes disengaged from a stationary contact 362 connected via a lead 363 to the terminal 17. The terminal 17 is the terminal which supplies high voltage terminal to the apparatus of FIGURE 1 and upon the opening of contacts 361–362, the entire system of FIGURE 1 is disconnected from the high voltage lines and becomes deenergized. The movable contact 361 now engages a stationary contact 364 connected via a lead 366, a resistor 377 and a diode 378 to a relay 379 of a flasher control circuit. The flasher control circuit is the same as that illustrated and described in the aforesaid patent application and is not described in detail here except to state that its associated contacts 381 form part of the circuitry required to produce periodic energization of the relay 379 and that the coil of the flasher is returned to ground potential via a capacitor 382. The flasher circuit controls a movable contact 383 which when the relay 379 is energized engages a stationary contact 384. The contact 383 is also connected to the lead 366 which now has high voltage applied thereto via the contacts 361–362. High voltage is thus periodically developed on the stationary contact 384 and a lead 386 connected thereto. The lead 386 is connected to a stationary contact 387 associated with the movable contact 339 of the relay 338. The lead 386 is also connected to a stationary contact 388 of the relay 338 and is adapted to be engaged by the movable contact 344 when the relay 338 is energized. The left side of the coil of the relay 338 is connected via a lead 389 to the lead 312 and thus is connected to the common return. The right side of the coil of the relay 338 is connected through a diode 391 and via resistor 392 to a stationary contact 393 which when the relay 357 is energized is engaged by a movable contact 394 thereof. Contact 394 is connected to the high voltage lead 310 and thus the relay 338 is energized. The main red terminal 332 is now connected through the movable contact 339 to the lead 386 upon which a pulsating voltage is developed as a result of the operation of the flasher relay 379. The voltage on the lead 386 is now applied to the terminal 332 and thus to the phase 1 or main street red signals 96 causing them to flash. Upon energization of the relay 338 its contact 344 engages the contact 388 and pulsating voltage is connected through various switches and contacts to the terminal 18 which is connected to the phase 2 or secondary red lamps. Thus, the lamps whose bulbs are not burned out are flashed periodically. It will be noted that the upper end of the coil of the relay 288 is connected through a diode 396 and resistor 397, and through a switch 398 to a stationary contact 399 of the relay 348. Stationary contact 399 is normally engaged by a movable contact 401 of the relay and the movable contact 401 is connected to the lead 386. Thus, a periodic pulsating high voltage is applied to the relay 288 which as previously indicated causes the phase 1 trouble light 251 at the central office to be energized. Since the relay 288 is periodically pulsed at a relatively rapid rate, the lamp 251 also pulses at a rapid rate during its period of energization thereby providing a distinct indication of a bulb burn-out situation.

The apparatus of FIGURE 4 also permits maintenance work to be performed on the various elements of the intersection controllers while still providing some active control at the intersection. Specifically, the apparatus permits the intersection controller to be switched to a condition for flashing amber lights on the main street and flashing red lights on the cross street. In order to provide such operation, a switch 398 is ganged with the switch 320 and the switch 346. Actuation of the switches causes the switch 398 to close to its contact 406. The switch 346 closes to its contact 407 and the switch 320 closes to contact 408. The switch 320 therefore applies the ungrounded side of the A.C. line to the lead 366 and energizes the flasher unit relay 379 so that pulsating voltage appears on the lead 386. The voltage on the lead 386 is now applied through the contacts 399 and 401 of the relay 348 to the switch 398 and through the switch 398 to its contact 406. The contact 406 is connected to the terminal 115 which in FIGURE 1 is connected to the main street amber lamps. Thus, a pulsating voltage is applied to the main street amber lamps. The lead 386 is also connected to the stationary contact 407 of the switch 346 and through the switch 346 and the contacts 347 and 349 of the relay 348 to the cross street red terminal 18. In consequence, the cross street red lamps are flashed in synchronism with the main street amber lamps. Substantially all of the circuitry of FIGURES 1 and 4 is deenergized at this interval since A.C. is removed from the leads 310 and 363 by actuation of the switch 320. Therefore, maintenance may readily be performed on the equipments while maintaining some control at the intersection. It should be noticed that in spite of the operation described immediately above, the relay 279 of FIGURE 4 is maintained energized and therefore the trouble light circuits at the central office are not effected.

It is often desirable to switch the lights at an intersection into the flashing condition from the remote or central control station. At late night hours it is common for lights at specific intersections to be switched over to flashing operation and it is simpler to perform this conversion at a central station where the whole series of master controllers are located then to have an individual go from box to box to effect the changeover. In order to effect the remote flasher control, the unit of FIGURE 3 is provided with a switch 411. The switch 411 has a stationary contact 412 connected via a lead 413 to the phase 1 common line 240. A movable contact 413 of the switch 411 is connected via a resistor 414 and appropriately poled diode 416 to the upper end of the coil of the relay 217 which has its lower end, as viewed in FIGURE 3, connected to the A.C. hot line through an appropriately poled diode. When the switch 411 is closed a common return is provided for the coil of the relay 217 when the system is in the phase 1 condition and therefore the relay 217 is energized but only in the phase 1 condition. This is important since at any intersection it is normally desired to switch to flasher operation when and only when the main street lights are green and the cross street lights are red. Energization of the relay 217 breaks the connection, at the contacts 216, between the terminal 218 and the lead 212 and causes the movable contact of contacts 216 to engage a stationary contact 420. The contact 420 is connected to the D.C. voltage terminal 278 so that a voltage is developed on lead 212 that is approximately double that previously appearing thereon.

The relay 217 has a further set of contacts 472 which are closed when the relay 217 is actuated. The closing of the contacts 472 causes a resistor 423 to be connected in parallel with the coils of the relays 207 and 211 since the resistor is connected via a lead 424 to the terminals 201 and 202 of the latching relay 177 to which the lead 204 of the relays 207 and 211 is also connected. The resistor 423 is employed to prevent the excess voltage from causing operation of the relay 207, the purpose of applying the high voltage 278 being to effect a control at the remote location without effecting the circuitry, other than to the extent previously indicated, at the central station. The switch 234 is now manually opened to remove the high voltage A.C. from the entire system so that the system of FIGURE 3 becomes quiescent with the controller in the phase 1 condition. In this condition the voltage appearing at the terminal 278 is applied to the output terminal 192 while the previous standard minus potential is applied to the terminal 194.

Reference is now made to FIGURE 4 for the description of the effect of this higher voltage differential between the terminals 192' and 194'. It will be noted that the upper end of the coil 293 of the relay 294 has connected thereto a terminal 426 which is connected through a load resistor 427 to the anode of the diode 292. A terminal 428 is also connected to the anode of the diode 292. The resistor 427 is a compensating load resistor which is asserted between the terminals 426 and 428, when remote control of the flasher circuitry is not provided at the particular intersection in question. However, when remote flasher control is to be provided, the resistor 427 is removed and the terminals 426 and 428 are connected to the terminals 426' and 428' also as illustrated in FIGURE 4. The terminal 426' is connected to the lower end as viewed in FIGURE 4 of a coil 429 of a relay 431 having a movable armature 432 and a stationary contact 433. The upper end of the coil 429 is connected through a resistor 434 to the terminal 428 and is also connected through an appropriately poled diode 436 to the terminal 426'. The relay 431 is adjusted so that the normal voltages appearing between the terminals 192' and 194' do not produce energization of the relay. However, the additional voltage provided, during flasher operation, from the terminal 278 in FIGURE 3 is sufficient to energize the relay 431. Upon the application of this increased voltage between terminals 192' and 194' during flasher operation the relay 431 is energized and its movable contact 432 engages its contact 433 applying high voltage thereto. The high voltage is applied to the movable contact 432 via lead 437, diode 438 and resistor 439. The relay 348 is now energized, the other end of its coil being returned to the common terminal 187. The relay 348 has three armatures 401, 349 and 315. Actuation of the armature 315 causes it to engage its stationary contact 441 which is connected via a lead 442 to the lead 366. Actuation of the armature 315 also removes high voltage from the lead 310 so that the entire system of FIGURE 4 becomes inoperative except for those portions which are now energized via the lead 442. The lead 442 being connected to the lead 336 causes the flasher unit relay 379 to be actuated causing pulsating voltage to be applied to the terminals 115 and 18. Thus, flashing amber is now displayed along the main street and a flashing red light is displayed along the cross street. When the operation is to be returned to normal control, which is effected by first closing the switch 234 and then opening switch 411, the system will immediately revert to a main street green and then continue normal cycling.

The control of flashing at the intersections may be placed under control of a time clock so that human control of this operation which normally occurs every night at the same time, is not necessary. Referring again to FIGURE 5 an electric timer 446 is provided which closes a set of contacts 447 at a prescribed time and opens them again at some later predetermined time. The contacts 447 are connected between the A.C. ungrounded lead 262 and a further lead 448. A separate relay 449 is provided for control of each of the units of FIGURE 3 and only one of these units will be described since the operation of all others is identical. The relay 449 has the lower end of its coil connected through an appropriately poled diode 451 and the resistor 452 to the lead 448. The upper end of the coil of the relay 449 is connected through another appropriately poled diode 453 to a terminal 454 which in FIGURE 3 is connected to the lead 240. Thus, ground return is applied to the terminal 454 when the controller of FIGURE 3 is in the phase 1 condition. When the controller of FIGURE 3 is in the phase 1 condition and the timer 446 has closed its contacts 447 the relay 449 is energized. The relay 449 has two movable contacts 456 and 457. The contact 457 normally engages a stationary contact 458 and these contacts are inserted in a lead connected between the high voltage lead 262 of FIGURE 5 and the high voltage terminal 236 of FIGURE 3. When contacts 457 and 458 are opened, high voltage is removed from the entire system of FIGURE 3 except the lower end of relay 217 which is connected to terminal 263 of FIGURES 3 and 5. The movable contact 456, when the relay 449 is energized, is closed to a contact 459 connected to a terminal 461. The movable contact 456 is connected to the terminal 454. The terminal 461 is connected, in FIGURE 3, via lead 462 to the upper end of the coil of the relay 217. A common return is now provided for energization of the coil of the relay 217 causing the contact 216 to engage the contact 420 and causing the contacts 422 to close. Engagement between contacts 216 and 420 applies the double voltage appearing on the terminal 278 to lead 212 and places the resistor 423 in parallel with the coils of relays 207 and 211. Thus, operation is identical with that achieved by manual operation of the switches 411 and 234 except that automatic control is now provided.

When the timer 446 again opens its contacts 447 the relay 449 is deenergized, high voltage is again applied to the system of FIGURE 3 and the relay 217 of FIGURE 3 is deenergized so that the apparatus again goes into a normal cycling function.

Other control accessories may be provided in this system. For instance, it may be desired to display "walk" and/or "don't walk" signals at the remote intersections. In order to permit such operation, and reference is initially made to FIGURE 4, a terminal 462 is connected to the lower end of the coil 302 of the relay 303 and a second terminal 463 is connected to the cathode of the diode 301. If the "walk-don't walk" unit is not to be connected, a compensating resistor 464 is connected between the terminals but under the conditions to be described, it is removed. A relay 466 is connected between the terminals 462 and 463 and has a set of contacts 467 connected in series between a source of A.C. voltage and for instance a walk signal at the intersection, the latter elements not being illustrated since they are conventional. The relay 466 like the relay 431 is not actuated in response to the normal voltage applied between the terminals 192' and 194' but requires the double voltage available from the terminal 278 of FIGURE 3. However, the relay 466 due to the polarity of the diode 301 operates on a phase 2 signal only rather a phase 1 signal as the relay 431. Thus, the walk control is provided in conjunction with the phase 2 operation. The walk control is under the control of the operator at the control station and its operation is initiated by actuation of a manually controlled switch 468 connected between the lead 242 and the lead 462 of FIGURE 3. The closing of the switch 468 which is permanently closed if a walk signal is to be displayed at the associated intersection at all times applies a common return to the relay 217 whenever the apparatus is in the phase 2 condition. Energization of the relay 217 then applies the requisite double voltage appearing at the lead 278 to the lead 204 which now however, is connected through the latching relay 177 to the lead 193 to the terminal 194. The negative voltage is now applied to the lead 192. Thus, the double positive voltage appears at the terminal 194', FIGURE 4 and the negative voltage appears at the lead 192'. This produces energization of the relay 466 which displays a walk signal to permit pedestrian traffic to cross the main street during the phase 2 operation, the main street having a red signal displayed therealong and the cross street having a green signal.

It is seen that the apparatus of the present invention permits a variety of controls and monitoring functions at an intersection by means of systems interconnected by only a pair of telephone or other private lines. Specifically, the display at the intersection may be made to sequence normally as between red, amber and green, or it may be made to go into a flasher type of operation either by controls located at the central station or at the intersection. The central station controls walk-don't walk signals while the local unit monitors loss of power, bulb burn out, out of phase operation etc. and controls distinctive displays at the central location for each of these malfunctions. Open circuit and short circuit of the interconnecting lines are monitored at the central station.

Referring now specifically to FIGURE 6 of the accompanying drawings, there is illustrated the circuit interconnections required to provide for interrelated sequencing of the controllers at a plurality of remote locations. It is often desired to cause the lights arrayed sequentially along a main street to acquire the green conditions in succession so that traffic may move at a planned rate of speed which may be the same along the entire route or which may vary at different sections along the route. Also, where rush hour traffic in the mornings and evenings move in opposite directions it may be desired to permit the wave to flow in one direction in the morning and flow in the opposite direction in the evening. The apparatus of FIGURE 6 provides the interconnections between the various units of FIGURE 3 required to effect this type of operation. Flow direction is controlled by contacts of relays 471, 472 and 473 the energization or deenergization of which are under the control of a time switch or program timer 474. The discussion of the effect of the operation of the relays 471 and 473 is deferred until a later portion of the specification.

The four blocks which represent FIGURE 3 bear the letter designations C, D, E and F and the initial sequence to be described will be C, D, E and F. Under these conditions master timing for the system is provided by the unit C and the D, E and F units are slaved to the timing provided by the unit C. A terminal 477 (see FIGURES 3 and 6) is connected through an appropriately poled diode to the side of the coil 181 of the latched relay 177 which normally receives pulses from the timing circuit including the tube 162. Thus, pulses can be applied to the terminal 477 to energize the coil 181 or if pulses are applied to the coil 181 from another source they are also applied to the terminal 477. The terminal 477 (see FIGURE 6) is connected through a resistor and appropriately poled diode to a terminal 478 which is connected in FIGURE 3 to the grid 160 of the tube 162. If a negative voltage is applied to the terminal 478, the timing circuit of tube 162 is disabled. A terminal 479 and reference is made again to FIGURE 3, is connected to the lead 242 which as previously described is the phase 2 common lead. A terminal 481 is connected to the upper end of the coil of a relay 484 of FIGURE 3, the other end of which is connected to the high voltage lead 223. If ground is applied to the terminal 481, the relay 484 is energized. Similarly a terminal 482 is connected to the upper end of a coil of a relay 486 the other end of which is connected to the high voltage lead so that if ground is applied to the terminal 482 the relay 486 is energized. The terminal 454, as previously described, is returned to ground or common during phase 1 of operation. A terminal 483 is connected in FIGURE 3 to a stationary contact 487 adapted to be engaged by a movable contact 488 of a relay 489 all of FIGURE 3. The relay 489 is energized by means of a timing circuit 491 which includes a dual triode 492 and a timing capacitor 493. Basically, this timing circuit is quite similar to the timing circuit of FIGURE 1 or of the other portion of FIGURE 3 and includes a means for charging the capacitor 493 negatively so as to prevent actuation of the tube 492 and discharging the capacitor 493 at a controlled rate by means of adjustable resistors. The capacitor 493 is connected through a resistor 494 to a grid 496 of the tube 492, the tube having the relay 489 connected in its plate-cathode circuit. The junction of the capacitor 493 and resistor 494 is connected through a further resistor 497 to a movable contact 498 of the relay 484. The movable contact is associated with stationary contacts 499 and 501, engaging the contact 499 when the relay 484 is de-energized. The stationary contact 501 is connected through a variable resistor 502 to common or ground terminal 187. The stationary contact 499 is connected to a movable contact 503 of the relay 486 which contact is associated with stationary contacts 504 and 506. Contact 504 is connected through a variable resistor 507 to the common or ground terminal 187 and the stationary contact 506, which is normally engaged by the contact 503, is connected to a lead 508. The lead 508 is returned by means of a series connection of a resistor 509 and a capacitor 511 to the cathode circuit of the tube 492. It will be noted that the cathodes of the tube 492 are connected to the common return or ground lead or bus 186. The capacitor 511 is charged to a negative potential by means of an appropriately poled diode 512 and resistor 513 connected in series between the high voltage lead 223 and the junction of the resistor 509 and the capacitor 511. The negative voltage developed across the capacitor 511 is applied via resistor 509 and lead 508 through the terminals 506, 503, 499, 498 via the lead 500 and through the resistor 497 to the left side, as viewed in FIGURE 3, of the capacitor 493 so as to apply a negative potential to the capacitor which maintains the tube 492 normally nonconductive.

Referring now both to FIGURES 3 and 6, it will be noted that no potential is developed on the terminal 478 of the C unit which will disable the timing mechanism. The terminals 454 and 482 of the C unit are normally connected together through the contacts 569 of the relay 471 and the terminal 483 of the C unit is connected through another set of contacts 561 of the relay 471 to the terminal 477 of the D unit. Under these conditions, the relay 486 is connected to the phase 1 common lead 238. Also, when the relay 489 of the C unit is energized and closes its contacts 487 and 488, negative voltage is applied to the terminal 483 from the lead 173. The negative voltage thus appearing on the terminal 483 is applied to the terminal 477 of the D unit. Similar interconnections are made between the D to E and E to F units.

The apparatus is provided with a further set of relays 562, 563, 514, and 515. When the sequence is from C to D to E to F the relay 512 remains deenergized. However, the relay 563 which is connected via a lead 510 to the high voltage terminal 236 is energized during phase 2 of the operation of its associated unit D due to its return to phase 2 common via the terminal 479 thereof. Upon energization, the relay 563 closes its contacts 518 and applies a negative bias to the terminal 478 which disables its associated timing mechanism. The requisite negative bias voltage for the terminal 478 is derived from a diode 517 connected between the coil of relay 563 and the lead 510.

Figure 7:
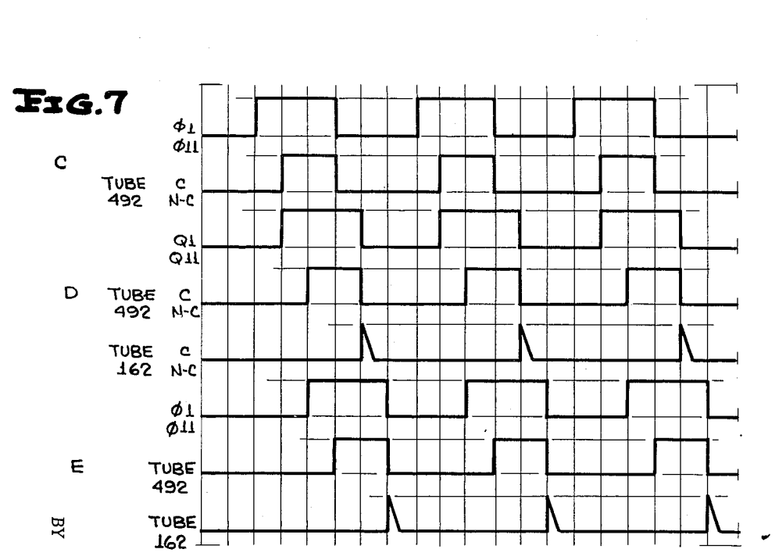
FIGURE 7 is a timing diagram illustrating the operation of the apparatus of FIGURE 6.

The operation of the apparatus which is now described with respect to FIGURES 3, 6 and 7, the latter figure being a timing diagram of the operation. It is initially assumed that all elements are in a phase 2 condition. Therefore each of the relays 563, 514 and 515 is energized and a bias is applied to each of the terminals 478 of the units D, E and F, so that these latter timing mechanisms are disabled. The timing mechanism of unit C times out and the apparatus is shifted to phase 1 operation in which condition it remains for a predetermined length of time after which it returns to phase 2. When the apparatus of FIGURE 3 enters the phase 1 stage the terminal 454 is returned to ground and due to its connection through the contacts 569 to the terminal 482 a ground return is applied to the relay 486 of FIGURE 3. The relay 486 is energized and its movable contact 503 engages the stationary contact 504. The capacitor 493 is now discharged at a controlled rate through the variable resistor 507. When the capacitor 493 times out, the tube 492 conducts and energizes the relay 489. Upon energization, relay 489 closes its contacts 488 and 487 and applies a negative voltage to its terminal 483. The terminal 483 of the C unit is connected through the contacts 511 to the terminal 477 of the D unit. The coil 181 of the latching relay 177 is energized and the D unit enters the phase 1 condition.

It will be seen that the D unit enters the phase 1 condition at a predetermined time interval, as determined by the timing out of the capacitor 493, after the C unit enters the phase 1 condition. The resistor 507, being variable, permits the timing interval to be varied in accordance with the particular characteristics desired at the intersection under control.

Referring specifically to FIGURE 7, the uppermost wave form illustrates the phase 1-phase 2 condition of the C unit, the second wave form illustrates the conduction period of the tube 492, the third wave form illustrates the phase 1, phase 2 condition of the D unit and the next lower wave form illustrates the timing on the tube 492 the next lower wave form illustrates the timing on the tube 162 of the D unit and so on. Upon the C unit entering phase 1, as previously indicated, capacitor 493 begins to time out and as illustrated in the second wave form, the tube 492 becomes conductive at a predetermined interval after the unit enters the phase 1 condition. The tube 492 becomes nonconductive when the C unit switches back to phase 2 due to the reapplication of negative voltage through contacts 503 and 506 to the capacitor 493. When the tube 492 conducts a voltage is applied to the terminal 477 of the D unit energizing the relay 181 and the D unit enters the phase 1 condition. When the unit D enters the phase 1 condition the ground return is removed from its terminal 479 and the relay 563 becomes non-conductive. The tube 162 of the unit D now begins to time out and after a predetermined length of time the tube 162 fires and switches the unit D back to the phase 2 condition. The tube 492 of the D unit becomes conductive at a predetermined time, as determined by the setting of the resistor 507, after the unit D enters the phase condition and upon becoming conductive applies a voltage to the terminal 483 which is connected through contact 521 to the terminal 477 of the E unit. This causes the E unit to enter phase 1 and the operation repeats itself through the units. The wave pattern can readily be detected by comparing the phase 1 wave forms of the C, D and E units. In the specific example illustrated each successive unit enters the phase 1 condition after a delay of one-third of the total phase 1 interval chosen. Therefore, although not illustrated herein the F unit enters phase 1 as the C unit returns to the phase 2 condition. It should be noted that the negative voltage applied to each terminal 477 is also applied to terminal 478 to insure a full negative charge on the associated timing capacitor 163.

If it is now wished to reverse direction of the wave the relays 471, 472 and 473 are energized, the latter relay opening its contacts 522 and disabling the relay 515. The negative bias is removed from the terminal 478 and renders the timing circuits of the F unit operable during the entire interval. The relay 473 also switches its second set of contacts 523 so as to interconnect its terminals 454 and 481. The relay 472 switches its contacts 524 for the same purpose as does the relay 471 switch its contacts 526 so as to interconnect terminals 454 and 481. The relay 471 switches the connection of its contacts 569 so as to interconnect the terminals 454 and 481 of the C unit and concurrently opens contacts 561 to break the connection between terminal 483 of the C unit and terminal 477 of the D unit. The relay 471 also closes contacts 527 and 528 the former to connect the lower end of the coil 562 to the terminal 479 of the C unit and the latter set of contacts 528 interconnects the terminal 483 of the D unit with the terminal 477 of the C unit. These same changes are made as between the F and E and E and D units by means of the contacts of the relays 472 and 473.

In operation the F unit now is independently controlled by its own timing mechanism and upon entering the phase 1 condition, the relay 484 is energized as a result of having its terminal 481 connected to ground return via the terminal 454 which is connected to the phase 1 common return lead 240. Upon energization, the relay 484 closes its movable contact 498 to the contact 501 and the capacitor 493 times out. When the capacitor 493 times out voltage is applied to the terminal 483 which is now connected via contacts 529 of the relay 473 to the terminal 477 of the E unit. The E unit now enters the phase 1 condition and after timing out of its tube 492 causes the D unit to enter the phase 1 condition which in turn, after timing out of its circuit causes the C unit to enter the phase 1 condition. The use of the independent timing resistances 502 and 507 which are inserted into the circuit by energization of the relays 484 and 486, respectively, permits the wave to be adjusted to the specific conditions obtaining in opposite directions at different hours and therefore lends complete flexibility to the system.

Figure 8:
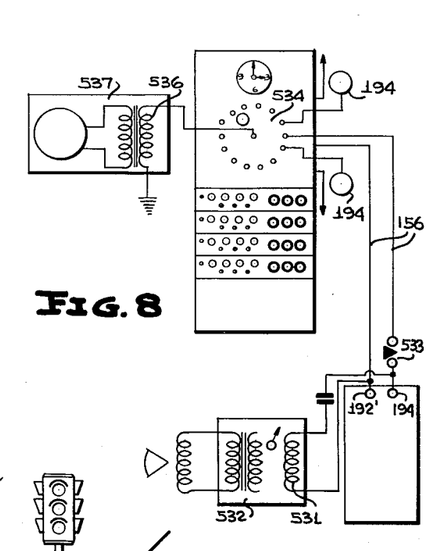
FIGURE 8 is an electrical schematic diagram of the telephone communication link provided by the apparatus of the present invention.

It is often necessary for a serviceman who is repairing the equipment at an intersection to be able to communicate with the central control office. As previously indicated the lines 156 are normally telephone lines or may be other coupled pairs over which voice communications is possible. Communication may be established by connecting a secondary winding 531 of an output transformer of a portable audio amplifier 532 across the line pair 156. A push button switch 533 is provided in the side of the line 156 connected to the terminal 194'. By pressing this switch the individual wishing to communicate with the central office breaks the lines so as to deenergize, momentarily, the relay 211 which causes the phase 2 trouble lamp 247 to be illuminated. By pulsing the line in accordance with a predetermined code the individual informs the central station that an individual is calling in. The trouble lamp will provide on the front of the unit of FIGURE 3 an indication of the pair across which the transmitter is coupled and by means of a selector switch 534 the central office attendant may connect an input winding 536 of an audio transformer of an audio receiver system 537 to the proper line pair 156. The usual telephone talk-listen switches may be operated at the two ends of the communication link to permit conversation between the intersection and control office. If the line pair 156 is not a conventional telephone line but the return loop is through an electrical ground, then the lower ends of the windings 531 and 536 may be connected to ground rather than to the other line of the line pair 156.

Figure 9:
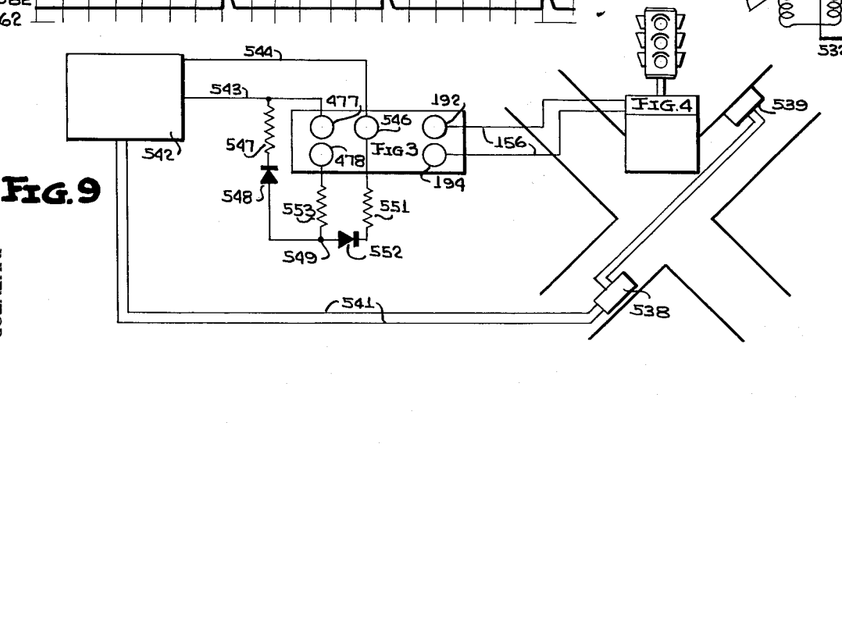
FIGURE 9 is a partial schematic electrical and partial block electrical diagram illustrating the apparatus required for placing the master controller under the control of a computer programming device.

Referring now specifically to FIGURE 9 of the accompanying drawings, there is illustrated an arrangement for placing the individual intersections under the control of a program computer or other program controlling device. A program computer is, in the specific example illustrated, to be controlled in accordance with the traffic flow along the main street at the intersection. Vehicle detectors 538 and 539 are placed at an intersection at such locations as to permit a count to be made of the traffic flowing along the street in opposite directions. The count derived from these units is applied via a pair of leads 541 which may be of the same type as the leads 156 to a program computer 542 located at the central control station. The computer is provided with a pair of output leads 543 and 544. The leads 543 and 544 are connected to terminals 477 and 546 of the apparatus of FIGURE 3; the latter terminal being connected to the left side, as viewed in FIGURE 3, of the coil 182 of the latching relay 177. Whenever a negative voltage pulse is applied to the lead 543 the coil 181 is energized and the latching relay 177 assumes the condition illustrated in FIGURE 3. If a negative voltage pulse is applied to the lead 544 then the coil 182 is energized and the relay 177 assumes the condition opposite to that illustrated. The lead 543 is further connected through a resistor 547 and an appropriately poled diode 548 to a junction 549. The lead 544 is connected through a resistor 551 and an appropriately poled diode 552 also to the junction point 549. The junction point 549 is connected via a resistor 553 to the terminal 478 which is connected to the grid of the timing tube 162. If a negative voltage is applied to the lead 543 then a negative voltage is developed at the terminal 478 and the same condition applies if the negative voltage is applied to the lead 544. Thus, when the programming devices 542 is supplying signals to the master controller of FIGURE 3 the internal timing unit of the controller is disabled and the unit is placed completely under the control of the computer control apapratus 542. As previously described the various phasing signals are developed on the terminals 192 and 194 and applied via the leads 156 to the apparatus of FIGURE 4 which is located at the same intersection as the detectors 538 and 539. The master controller of FIGURE 3 may be connected in circuit with other master controllers as illustrated in FIGURE 6 so as to provide wave control of the lights or each of the master controllers may be separately connected to the leads 543 or 544 so as to produce concurrent operation of the various signals.

While I have described and illustrated several embodiments of my invention, it will be clear that variations of the details of construction which are specifically illustrated and described may be resorted to without departing from the true spirit and scope of the invention as defined in the appended claims.

What I claim is:

1. A traffic light control system comprising an intersection controller having interval timing means for controlling the display of signals at an intersection, a supervisory system associated with said intersection controller at said intersection, a master controller located at a central control station, said master controller having interval timing means for generating timing signals, a single pair of leads interconnecting said master controller and said supervisory system, means included in said supervisory system and responsive to generation of timing signals by said master controller for disabling said interval timing means of said intersection controller and for controlling the display of signals in accordance with the said timing signals, wherein said master controller includes means responsive to said timing means thereof for applying a voltage of a first polarity to said pair of leads during a first phase of operation and for applying a voltage of a reverse polarity to said pair of leads during a second phase of operation of said timing means and wherein said means included in said supervisory system causes said intersection controller to display a green light along a street during the first phase and a red light along said street during said second phase, means for materially increasing said voltage of said first polarity, and means included in said supervisory unit and responsive to said increased voltage of said first polarity for disabling said intersection controller and for causing flashing operation of the amber signals along said street and the red signals along a second street at said intersection.

2. The combination according to claim 1 wherein said master control unit includes a first alarm means and a second alarm means, means responsive to an open circuit condition in said pair of lines for energizing said first alarm means and means responsive to a short circuit across said pair of lines for energizing said second alarm means.

3. The combination according to claim 2 wherein said supervisory system includes means responsive to a power failure for developing a short circuit and an open circuit across said pair of leads each during a different phase of operation of said timing means of said master controller.

4. The combination according to claim 3 wherein said first alarm means is energized in response to the fixed condition of display providing a continuous red signal along said street.

5. The combination according to claim 2 wherein said supervisory system includes means responsive to said intersection controller maintaining said traffic lights in a fixed condition of display for energizing one only of said first alarm means and said second alarm means, depending upon the fixed condition of display.

6. The combination according to claim 2 wherein said supervisory system includes means responsive to a burn-out of a red bulb in said traffic signals for causing the remaining red bulbs to flash at a rate greater than the changes in said phases and for causing only one of said alarm means to be energized at said rate.

7. A traffic light control system comprising an intersection controller having interval timing means for controlling the display of signals at an intersection, a supervisory system associated with said intersection controller at said intersection, a master controller located at a central control station, said master controller having interval timing means for generating timing signals, a single pair of leads interconnecting said master controller and said supervisory system, means included in said supervisory system and responsive to generation of timing signals by said master controller for disabling said interval timing means of said intersection controller and for controlling the display of signals in accordance with the said timing signals, wherein said master controller includes means responsive to said timing means thereof for applying a voltage of a first polarity to said pair of leads during a first phase of operation and for applying a voltage of a reverse polarity to said pair of leads during a second phase of operation of said timing means and wherein said means included in said supervisory system causes the intersection controller to display a green light along a street during the first phase and a red light along said street during said second phase, means for materially increasing said voltage of said reverse polarity, a pedestrian control signal located at said intersection, and means including in said supervisory unit responsive to said increased voltage of said reverse polarity for illuminating said pedestrian control signal.

8. A system for controlling the traffic lights at a plurality of intersections comprising a separate intersection controller for the lights at each intersection having interval timing means, a central controller including a separate master controller for each of said intersections, each of said master controllers having interval timing means, a single pair of signal leads connecting each of said intersection controllers with its respective master controller for normally coupling interval timing signals from each master controller to its respective intersection controller to over-ride the intersection interval timing means, means responsive to an open circuit or a short circuit on the lines connecting each of said master and intersection controllers for decoupling the master controller timing means from its respective intersection controller timing means so that lights at the intersection are controlled by the intersection timing means, and means interconnecting said master control units for disabling their associated timing means and placing said master control units under control of the timing means of a further master control unit.

9. The combination according to claim 8 further comprising a time delay unit interposed between each successive master control unit to delay generating of said timing signals by succeeding master control units.

10. The combination according to claim 8 further comprising means for reversing the order of successive generation of timing signals by said master control units.

References Cited by the Examiner

UNITED STATES PATENTS

| | | | |
|---|---|---|---|
| 2,214,253 | 9/1940 | Lomax | 340—40 |
| 2,241,047 | 5/1941 | Wilcox. | |
| 2,832,060 | 4/1958 | Hendricks et al. | 340—35 |
| 3,079,587 | 2/1963 | Barker | 340—35 |
| 3,107,338 | 10/1963 | Barker | 340—41 |
| 3,119,093 | 1/1964 | Willyard | 340—40 |

FOREIGN PATENTS 521,588    5/1940    Great Britain.

OTHER REFERENCES

"The 'E' Vehicle Supervised Traffic Control System," a publication by Eagle Signal Corp., Moline, Ill. Bulletin E50. January 1959, pp. 6, 7, and 10 relied on.

NEIL C. READ, *Primary Examiner.*

R. M. ANGUS, *Assistant Examiner.*